United States Patent [19]

Wong et al.

[11] Patent Number: 4,551,664
[45] Date of Patent: Nov. 5, 1985

[54] VELOCITY-POSITION SERVO WITH IMPROVED GAIN CONTROL

[75] Inventors: Harvey C. Wong, Kensington; Frank W. Lin, Los Altos, both of Calif.

[73] Assignee: Mechatron Systems, Inc., Sunnyvale, Calif.

[21] Appl. No.: 536,553

[22] Filed: Sep. 27, 1983

[51] Int. Cl.$^4$ .............................................. G05B 11/18
[52] U.S. Cl. .................................... 318/592; 318/594; 318/619; 318/561
[58] Field of Search ............... 318/592, 594, 619, 561, 318/590

[56] References Cited

U.S. PATENT DOCUMENTS

| | | | |
|---|---|---|---|
| 3,721,882 | 3/1973 | Helms | 318/594 |
| 4,347,470 | 8/1982 | Kohzai et al. | 318/602 |
| 4,486,693 | 12/1984 | Hamati et al. | 318/615 X |

Primary Examiner—B. Dobeck
Attorney, Agent, or Firm—Townsend & Townsend

[57] ABSTRACT

In a rotary printer control system, a dual mode servo for controlling the velocity and position of a rotary print wheel and a print wheel carriage is normally operated at a relatively high gain value. When the servo is switched from the velocity mode to the position mode, the length of time the servo remains in the position mode is monitored and, if this exceeds a predetermined maximum time period, the gain of the servo loop is switched to a relatively low value in order to reduce oscillations of the print wheel or carriage about the HOME position. The gain reduction is accomplished by inserting a supplemental R-C network in parallel with the high gain R-C network, and the range or ratios of the relatively high gain to the relatively low gain values is from about 10 to about 30.

10 Claims, 2 Drawing Figures

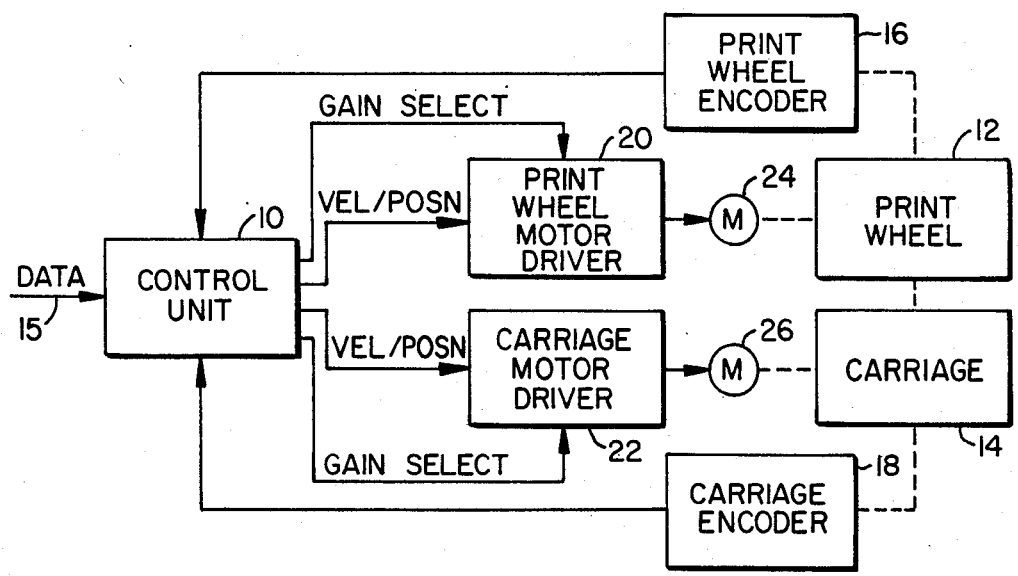
FIG._1.

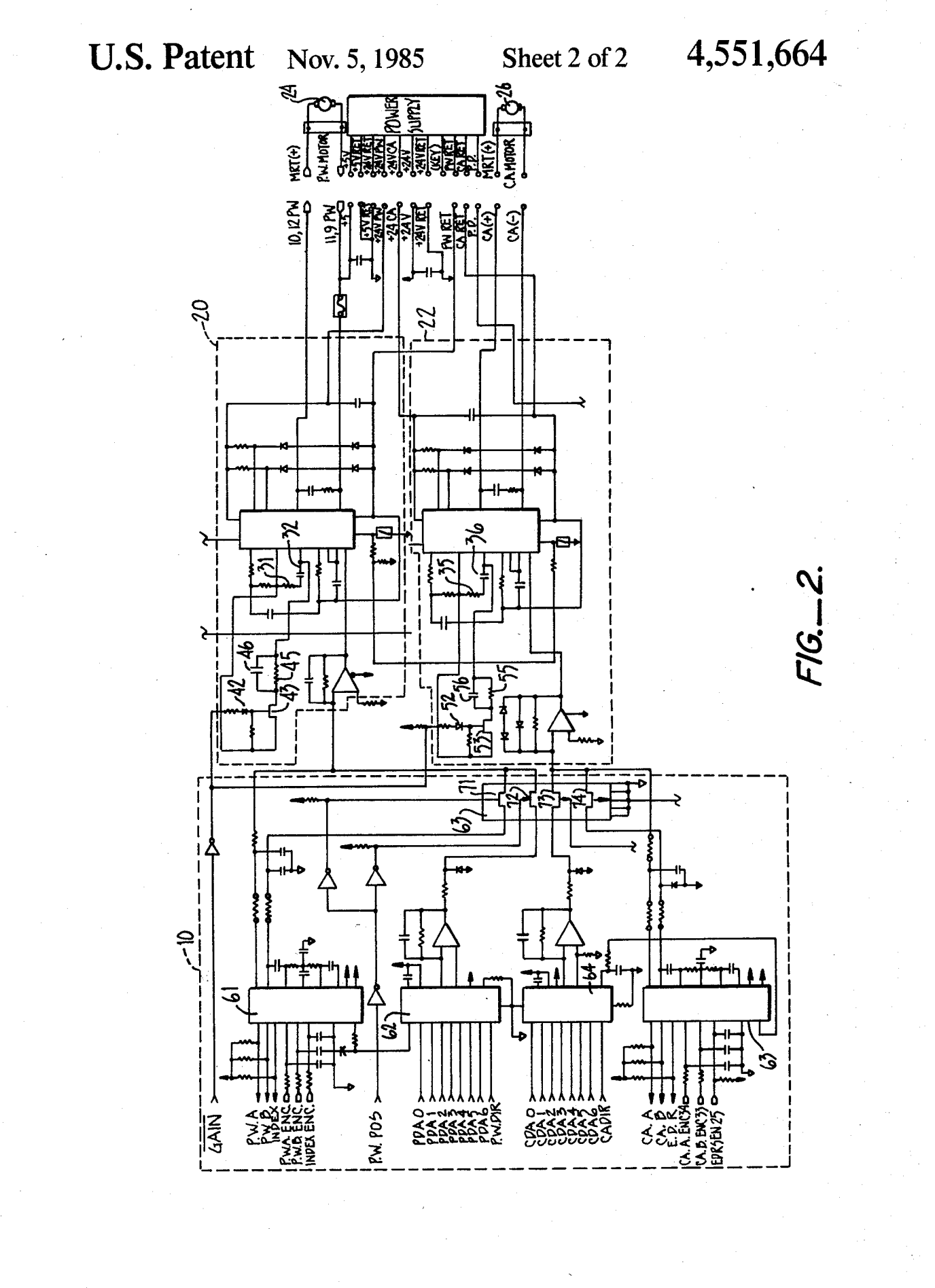

FIG.—2.

VELOCITY-POSITION SERVO WITH IMPROVED GAIN CONTROL

BACKGROUND OF THE INVENTION

This invention relates to servo control systems for use in electro-mechanical printing devices of the type employing a rotary print wheel, sometimes termed a "daisy wheel printer", wherein the print wheel is both rotated and translated by a pair of motors under control of an electronic control system.

Rotary printing systems having servo control are known in which the rotary print wheel is mounted on a carriage for translation across the width of the print throat area during printing. The carriage is typically translated in right and left directions through a series of cables and pulleys driven incrementally by a DC motor controlled by a suitable electronic control system. As the carriage-wheel assembly is translated from character position to character position along the print line, the print wheel is rotated so that the character pad bearing the next character to be printed is aligned with the striking end of a print hammer, also mounted on the carriage, when the carriage is momentarily decelerated to a rest position. When the carriage has reached the rest condition, the print hammer is actuated to impress the character borne by the pad against an inking ribbon and the face of the printing media to print that character. After the print hammer rebounds, the carriage is translated to the next character location, the print wheel is rotated so that the proper character pad is aligned with the print hammer, and the next character is printed. This process continues until a complete line has been so printed, after which the carriage motion is reversed to print the next line of characters in reverse order, or the carriage is returned to the left-most starting position in preparation for printing the next line of characters.

Proper operation of such rotary printing systems requires an accurate servo control system for both the print wheel and the carriage. The servo system most typically used is a dual mode system having a velocity mode and a position mode. In the velocity mode, the velocity of the controlled element (i.e., print wheel or carriage) is controlled in accordance with a pre-selected velocity profile to insure optimum initial acceleration to a maximum design velocity value, followed by stepped deceleration until the desired linear or rotary position is achieved. Once this position (frequently termed the HOME position) has been reached, the servo is switched to a position mode of operation in which the linear or angular position of the controlled element is maintained substantially constant. In both modes of operation, position feedback signals generated by a position encoder associated to the controlled element (typically an optical encoder for generating sinusoidal position signals) are used to provide the necessary feedback information specifying the instantaneous position of the controlled element. These signals, either in their pure sinusoidal form or in logically processed pulse form, are coupled to a control unit in which the position information is used to determine certain key parameters, such as direction of print wheel rotation, incremental linear or angular distance from the present position to the next desired position, actual velocity of the controlled element, required incremental velocity, and the like. In addition, the control unit supervises the operating mode of each servo system, i.e., whether velocity or position mode, and generates the necessary servo control signals for switching the operation between the two distinct modes. In addition, when in the position mode the servo system uses one of the analog position feedback signals to monitor excursions of the controlled element away from the desired HOME position in order to generate corrective position signals to the motor driving the controlled element in order to counteract any such deviations.

One major problem or disadvantage with known dual mode servo systems used in rotary printing systems lies in the gain value selected for the system as a whole. Specifically, in order to provide the relatively fast response to changes in position and velocity of the controlled element, the known servo loops typically employ a fixed relatively high gain. While operation of the servo system with relatively high gain provides the fast response time required for most rotary printing applications, it suffers from the disadvantage that even slight excursions of the controlled element from the home position when the servo is in the position mode will cause oscillations of the controlled element about the home position during long detent pauses of the controlled element, such as when the printer is awaiting new character information after completion of the previous text.

SUMMARY OF THE INVENTION

The invention comprises an improvement to a dual mode servo control system for a rotary printing system which eliminates the disadvantage of oscillations during long detent periods in the position mode, and which is inexpensive to implement and highly reliable in operation.

From a method standpoint, the invention comprises a method of operating a rotary printer dual mode servo system having a velocity mode and a position mode, the method comprising the steps of operating the servo system in the velocity mode with a first relatively high gain, switching the servo system to the position mode, operating the servo system in the position mode at the relatively high gain for a maximum predetermined time period, and reducing the gain of the servo system to a relatively low value whenever the maximum predetermined time period has elapsed without resumption of the velocity mode. In a system in which the relatively high gain of the servo system is established by a first R-C network, the step of reducing the gain of the servo system includes the step of inserting a second R-C network into the gain establishing network of the system.

In a further method aspect of the invention, the method is implemented in a rotary printer control system having a position encoder for generating position signals corresponding to the movement of a controlled element, a motor driver for the controlled element, and an electronic dual mode servo having a velocity mode and a position mode responsive to the encoder position signals for controlling the motor driver to establish desired velocities and rest positions of the controlled element in a cyclic manner, the method proceeding by establishing a relatively high gain value for the servo during cyclic operation in the velocity mode and the position mode, monitoring the time period during which the servo is maintained in the position mode, and reducing the gain value of the servo to a relatively low value when the servo is maintained in the position mode for a predetermined maximum time period. In implementing the method, the ratio of the relatively high and relatively low gain values preferably lies in the range from about 10 to 30 when the controlled element is the print wheel carriage, and from about 10 to 20 when the controlled element comprises the rotary print wheel.

From the system standpoint, the invention comprises an improvement in a rotary printer control system having a dual mode servo for controlling the velocity and position of a controlled element selected from the group consisting of a rotary print wheel and a print wheel carriage, encoder means for generating position signals corresponding to the actual movement of the controlled element, control means responsive to the position signals from the encoder means for generating desired velocity signals and control signals for switching the servo between a velocity mode and a position mode; the improvement comprising first gain control means for normally operating the servo at a relatively high gain in both the velocity mode and the servo mode, means for determining the length of time the servo is maintained in the position mode, and means for reducing the gain of the servo unit to a relatively low value when the servo is maintained in the position mode for a predetermined maximum time period. The first gain control means and the gain reducing means provide relatively high and relatively low gain values, respectively, having a ratio in the range from about 10 to about 30 overall. Further, the predetermined time period is in the range of about one second.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a schematic block diagram of a rotary printer control system incorporating the invention; and FIG. 2 is a logic diagram illustrating a preferred embodiment of the invention.

DESCRIPTION OF THE PREFERRED EMBODIMENT

Turning now to the drawings, FIG. 1 illustrates in block diagram form a rotary printer control system incorporating the invention. As seen in this FIG., a control unit 10 for a rotary print wheel, schematically depicted as element 12 and a print wheel and hammer carriage, schematically depicted as element 14, receives data signals via a data input line 15 specifying the text content to be printed. The source of such data on input conductor 15 may be a typewriter keyboard, an associated word processing computer, a remote computer or the like.

Control unit 10 also receives position signals from a print wheel encoder 16 and a carriage encoder 18 which are linked, respectively, to the print wheel 12 and the carriage 14 by any suitable means. Typically, optical encoders of a known type are employed which generate one or more sinusoidal or quasi-sinusoidal electrical position signals in response to rotational movement of print wheel 12 and linear movement of carriage 14. Suitable encoders are well-known to those skilled in the art.

The position signals fed back from the respective controlled elements (i.e., print wheel 12 and carriage 14) from the corresponding encoders 16 and 18, may comprise either the sinusoidal position signals or logically processed binary pulse trains corresponding to the sinusoidal or quasi-sinusoidal position signal trains.

Control unit 10 contains the necessary electronic subunits required to generate from the input data signals and the position feedback signals the conventional control signals used to operate a print wheel motor driver 20 and a carriage motor driver 22, each of which units provides the necessary driving current to the associated print wheel motor 24 and carriage motor 26. Motor 24 is mechanically linked to print wheel 12, while carriage motor 26 is mechanically linked to translatable carriage 14, as suggested by the broken line connections therebetween. Control unit 10 preferably incorporates a type 8031 microprocessor available from Intel Corporation of Santa Clara, Calif.

The print wheel motor driver 20 and carriage motor driver 22 are similar units which generate, in response to input velocity/position control signals, appropriate driving currents for their respective associated motors 24 and 26, so that the print wheel 12 and carriage 14 are respectively rotated and translated at the proper design velocities (when the servo is operated in the velocity mode) and maintained in a relatively stationary position when the HOME position is achieved (when the servo is operated in the position mode).

The print wheel motor driver unit 20 and the carriage motor driver unit 22 are provided with a gain establishing network which permits each servo loop consisting of a controlled element, an encoder, the control unit, a driver unit and a motor unit, to be normally operated with relatively high gain so that the servo loop has a relatively fast feedback response. In addition, however, each motor driver unit 20, 22 can be switched to a relatively low gain operating mode in response to gain select control signals generated by the control unit 10 as described more fully below.

In operation, when control unit 10 senses newly presented data requiring motion of either the print wheel 12, the carriage 14, or both, the corresponding servo loop is switched to the velocity mode of operation. During this mode of operation, the control unit 12 generates velocity control signals for the corresponding driver unit 20, 22, which is operated in the relatively high gain mode in accordance with the gain select control signal. The driver unit 20, 22 provides the proper current to the corresponding motor 24, 26 in order to ensure motion of the associated controlled element 12, 14 in accordance with a preselected velocity profile. During motion of each controlled unit 12, 14, the feedback position signals from the corresponding encoder unit 16, 18 provide actual position signals to the control unit 12, which uses these signals to monitor the progress of the controlled unit 12, 14 and the velocity thereof. As the controlled unit 12, 14 approaches its proper destination, the velocity signals generated by control unit 10 are correspondingly changed in accordance with the preselected velocity profile until the controlled unit 12, 14 is close to the home position. At this point, control unit 10 switches the servo operation to the position mode in which the feedback position signals are used to control any excursions of the corresponding controlled element 12, 14 away from the HOME position.

The control unit 12 contains a microprocessor incorporated timer which monitors the length of time that each servo loop remains in the position mode after switchover from the velocity mode. Once a character specified by the input data has been printed, the servo loops are again switched to the velocity mode to print the next character, with the following exceptions. If the next character to be printed is a repeat of the previously printed character, there is no need to reposition print wheel 12: consequently, the print wheel servo remains in the position mode. If the printed character is the last character in a message or text, the print wheel 12 and carriage 14 may remain in their present positions until subsequently received data requires further motion. In such cases, both servo loops are maintained in the position mode.

In order to avoid the problem of oscillation of the controlled elements 12, 14 whenever the corresponding servo loop is maintained in the position mode for a relatively long period of time, the control unit 10 generates a relatively low gain switching signal which results in a substantial reduction of the servo loop gain. In the preferred embodiment, the maximum time period during which a servo loop is permitted to remain in the high gain configuration when in the position mode is approximately one second. The key gain parameter in implementing the invention is the ratio of the relatively high gain to the relatively low gain, which is essentially a function of frequency. For example, at a frequency of 500 Hz, the gain ratio is approximately 11 for the carriage, which has been found to be sufficient to eliminate oscillations about the HOME position. It has been found empirically that a gain ratio below about 5 does not produce satisfactory results. In general, the range of gain ratios found to be useful for the carriage servo is from about 10 to about 30, while the range for the print wheel servo has been found to be about 10 to 20.

With reference to FIG. 2, the print wheel motor driver 20, and carriage motor driver 22 are illustrated in detail and are seen to comprise a pair of identical type L292 motor driver units available from SGS of Scottsdale, Ariz. The relatively high gain operation of the upper motor driver is provided by an R-C network comprising resistor 31 and capacitor 32, and a similar R-C network comprising resistor 35 and capacitor 36 is used to provide a similar relatively high gain value for the lower motor driver. The reduction in gain to the relatively low value is accomplished by switching in an additional R-C network in parallel with the permanently connected R-C network in response to the GAIN signal. For the upper servo loop, when the GAIN signal switches to a low logic level, this signal is inverted by an inverter 41 and applied via a diode 42 to the gate of a FET 43. The drain of FET 43 is coupled to one end of resistor 31, while the source of FET 43 is coupled to one terminal of an R-C network comprising resistor 45 and capacitor 46. The other terminal of this network is coupled to the terminal of capacitor 32 remote from resistor 31. When FET 43 is switched on, the left terminal of the R-C network 45, 46 is coupled to the indicated terminal of resistor 31, thereby placing the R-C network 45, 46 in parallel with the R-C network 31, 32, which effects the gain reduction noted above. Operation of the gain reduction network for the lower motor driver is accomplished in an identical fashion by means of elements 52, 53, 55 and 56.

The velocity/position signals for the print wheel motor driver are generated from a type L290 tachometer 61, available from SGS of Scottsdale, Ariz. and a digital to analog convertor 62, in combination with one-half of a four element block of FET switches 63. During the velocity mode of operation, the actual velocity signal output from tachometer 61, which is generated in response to a pair of position signals from the print wheel encoder 16 labeled PWA and PWB, is summed with a desired velocity signal generated by DAC 62 in response to the desired velocity signals labeled PDA0 through PDA6 and coupled through FET switch 72. When the print wheel servo is switched to the position mode by a change of state of the PWPOS signal, an analog position signal A generated by tachometer 61 from the PWA input signal is coupled through FET switch 71 and summed with the velocity signal output from tachometer 61 to maintain the print wheel 12 in the HOME position.

The operation of the carriage motor servo is identical in operation to that described above, with lower FET switches 73, 74 being used for the desired carriage velocity and desired carriage position signal summing with the actual carriage velocity signal.

As noted above, the state of the GAIN select signal is determined by a timer in the associated microprocessor portion of the control unit 10 (not illustrated), which is initiated by the change of state of the PWPOS and CAPOS position signal. Implementation of such a timer and the logic required to generate the gain select signal is well within the skill of the ordinary practitioner in the art.

While the above provides a full and complete disclosure of the invention, various modifications, alternate constructions and equivalents may be employed without departing from the spirit and scope of the invention. Therefore, the above should not be construed as limiting the invention, which is defined by the appended claims.

What is claimed is:

1. A method for operating a rotary printer dual mode servo system having a velocity mode and a position mode, said method comprising the steps of:
    (a) operating said servo system in the velocity mode with a first relatively high gain;
    (b) switching said servo system to the position mode;
    (c) operating said servo system in said position mode at said relatively high gain for a maximum predetermined time period; and
    (d) reducing the gain of said servo system to a relatively low value after said maximum predetermined time period has elapsed without resumption of said velocity mode.

2. The method of claim 1 wherein the relatively high gain of said servo system is established by a first R-C network, and wherein said step (d) of reducing includes the step of inserting a second R-C network into the gain establishing portion of said system.

3. The method of claim 2 wherein said step of inserting includes the step of coupling said second R-C network in parallel with said first R-C network.

4. In a rotary printer control system having a position encoder for generating position signals corresponding to the movement of a controlled element, a motor driver for the controlled element, and an electronic dual mode servo having a velocity mode and a position mode responsive to the encoder position signals for controlling the motor driver to establish desired velocities and a rest position of the controlled element in a cyclic manner, an improved method of operating the servo comprising the steps of:
    (a) establishing a relatively high gain value for the servo during cyclic operation in the velocity mode and the position mode;
    (b) monitoring the time period during which the servo is maintained in the position mode; and (c) reducing the gain value of the servo to a relatively low value when the servo is maintained in the position mode for a predetermined maximum time period.

5. The method of claim 4 wherein the ratio of the relatively high and relatively low gain values is in the range from about 10 to about 30.

6. The method of claim 4 wherein the controlled element comprises a rotary print wheel and the ratio of the relatively high and relatively low gain values is in the range from about 10 to about 20.

7. The method of claim 4 wherein the controlled element comprises a print wheel carriage and the ratio of the relatively high and relatively low gain values is in the range from about 10 to about 30.

8. In a rotary printer control system having a dual mode servo for controlling the velocity and position of a controlled element selected from the group consisting of a rotary print wheel and a print wheel carriage, encoder means for generating position signals corresponding to the actual movement of the controlled element, control means responsive to the position signals from the encoder means for generating desired velocity signals and control signals for switching the servo between a velocity mode and a position mode, the improvement comprising first gain control means for normally operating the servo at a relatively high gain in both the velocity mode and the position mode, means for determining the length of time the servo is maintained in the position mode, and means for reducing the gain of the servo unit to a relatively low value when the servo is maintained in the position mode for a predetermined maximum time period.

9. The invention of claim 8 wherein said first gain control means and said gain reducing means provide relatively high and relatively low gain values, respectively, having a ratio in the range from about 10 to about 30.

10. The invention of claim 8 wherein said predetermined time period is about one second.

* * * * *